United States Patent Office 3,510,177
Patented May 5, 1970

3,510,177
SEAL FOR A ROTARY SHAFT
Yoshihiro Shimula, Tokyo, Japan, assignor to Rigaku Denki Company Limited, Tokyo, Japan
Filed Aug. 22, 1967, Ser. No. 662,529
Int. Cl. F16c *1/24, 33/72;* F16d *15/48*
U.S. Cl. 308—36.1                              4 Claims

ABSTRACT OF THE DISCLOSURE

Apparatus is provided for forming an airtight seal around a rotatable shaft inserting into a casing operating under a vacuum. To accommodate the shaft, there is provided a cylindrical passage in which are provided spaced packing means which encircle the shaft and form an annular receptacle to which oil is supplied under approximately atmospheric pressure. The packing elements include portions tapering conically away from the interior of the casing and making tangential contact with the rotatable shaft. Any air which leaks past a packing member along the shaft is evacuated to the conduit system feeding oil to the space between the packing elements and since the oil is under the atmospheric pressure it can leak past one of the packing elements towards the interior of the casing to lubricate the contacts between this packing element and the shaft and as well to lubricate any bearing means which might be employed.

DRAWING

Figure 1:
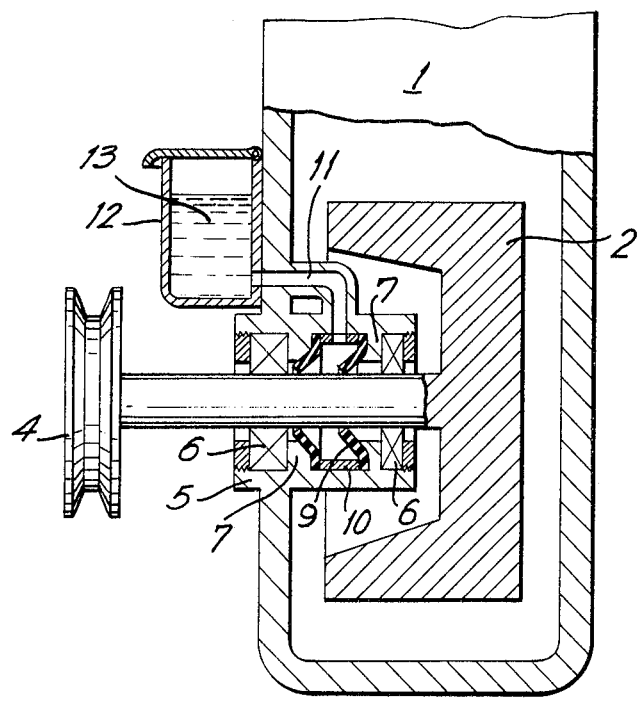
Figure 2:
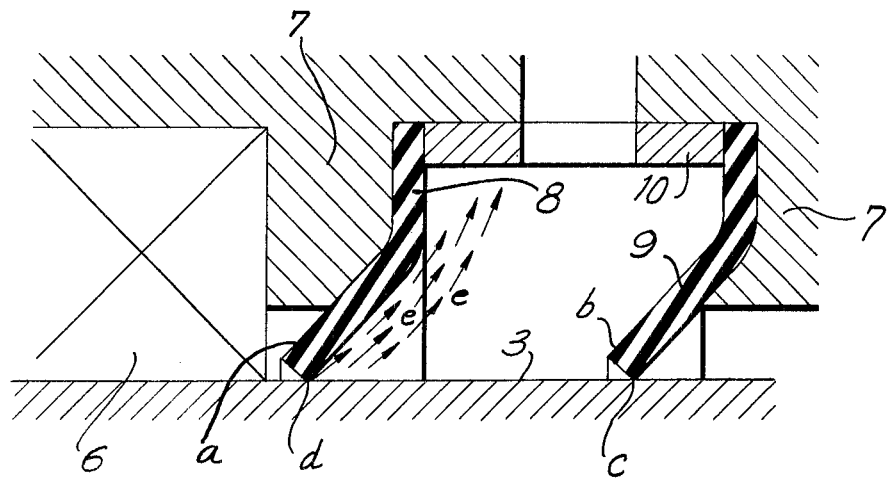

FIG. 1 is a longitudinal section taken through the axis of a rotary shaft and a bearing incorporating the seal assembly of the present invention; and FIG. 2 is an enlarged fragmentary view illustrating the function and effect of the present invention.

DETAILED DESCRIPTION

This invention relates to seals for rotary shafts and more patricularly to devices for sealing the bearings of high-speed rotary shafts extending through the walls of vacuum chambers in an airtight relation.

Heretofore, Wilson seals, O-ring seals or other such mechanical seals have been employed as means for maintaining an airtight condition with respect to a rotary shaft inserted through a wall of a vacuum chamber. However, since Wilson seals or O-ring seals are generally made from elastic rubber-like material, they wear out rapidly when used to seal shafts which rotate at a high speed such as, for example, is the case in connection with an anti-cathode in an X-ray tube. In fact, it can be generally observed that conventional seals have various disadvantages in relation to shafts rotated at high speeds such as causing voids to be formed along the surfaces of the shafts because the seals are generally applied with a highly viscous oil such as silicone grease, in such a manner as possibly to lead to air leakage when there is a shortage of oil applied.

An object of the present invention is to provide an improved mechanical seal which is particularly suitable for the mounting and supporting of a high-speed rotary shaft extending through the wall of a vacuum chamber, which seal eliminates the disadvantages of the known seals mentioned above.

A further object of the present invention is to provide an improved method of sealing bearings for high-speed rotating shafts extending through the walls of vacuum chambers to maintain perfect air seals.

According to the present invention, there may be provided an improved bearing seal device, which comprises a reservoir filled with oil having a sufficiently low viscosity and a fluidity together with a low vapor pressure, through which reservoir a rotary shaft is inserted from the outer atmosphere into a vacuum, said oil reservoir having communication with the atmosphere.

Further and more specific objects and advantages of the present invention and the manner in which it is carried into practice are made apparent in the following specification wherein, as noted above, the invention is described in detail with reference to the accompanying drawing.

In the drawing, a vacuum airtight casing 1 can be evacuated by means of a suitable vacuum pump (not shown) connected to the casing. In the vacuum chamber, there is a member 2 having a rotary shaft. The member 2 may be, for example, a rotary anti-cathode of an X-ray tube. The shaft 3 extends into the exterior of the casing through the wall thereof and is driven by suitable means such as a drive pulley 4 at its outer end. A cylindrical portion or chamber 5 is formed through the casing wall at the part through which the shaft 3 is inserted. A pair of bearings 6 are disposed at both ends of the cylindrical chamber 5 respectively and a pair of annular washers 7 are provided between the bearings leaving a suitable space therebetween. The inner peripheries of the washers 7 are formed in conical shape to provide slanting surfaces and annular rubber packings 8 and 9 are respectively secured to the facing sides of the washers 7. The inner peripheries of the packings 8 and 9 are slidably engaged with the shaft 3 while their outer peripheries are secured to a cylindrical spacer 10. One end of a conduit 11 communicating vertically downwards with a space between the packings 8 and 9 through a vereical hole formed in the top of spacer 10 is connected to the side wall of the cylindrical chamber 5 and the other end of the conduit 11 is connected to an oil tank or reservoir 12 secured to the outer side of the casing 1. The tank 12 is filled with oil 13 having a sufficiently low viscosity, a fluidity and a very low vapor pressure to fill the space between the packings 8 and 9.

As set forth above, according to the present invention the rotary shaft 3 is inserted through a pair of suitably spaced annular packings 8 and 9 into the vacuum casing 1, the space between the packings is filled with oil 13 having a sufficiently low viscosity, sufficient fluidity and a low vapor pressure and the oil 13 communicates with the atmosphere so that the outer surfaces *a* and *b* of the packings 8 and 9 are exposed to atmospheric pressure through the oil and to a vacuum respectively.

As clearly shown in FIG. 2, at a slidable tangent *c* between the packing 9 and the shaft 3, the inner and the outer surfaces of the packing are respectively exposed to a vacuum and to atmospheric pressure through the oil. The oil 13 under the atmospheric pressure will seep or leak by the tangential edge *c* to prevent the packing from rapidly wearing due to a lack of oil at the tangential edge. If the bearings 6 are disposed in a vacuum as in the case of the illustrated embodiment, they will be sufficiently lubricated by the oil 13 leaking past the tangential edge *c* and flowing along the shaft surface. On the other hand, at a tangential edge *d* between the packing 8 and the shaft 3, the inner surface of the packing 8 is exposed to the oil at atmospheric pressure while the outer surface thereof is also exposed to open air. Therefore, there is actually no difference between the pressures on both sides of the packing. Thus no substantial amount of air will leak into the oil past the tangent *d*. Even if a slight amount of air leaks into the oil, it will ascend through the oil in the form of bubbles as shown by arrows *e* because of low viscosity of the oil, and thus the bubbles will return to the open air. Since the oil 13 has fluidity and low viscosity, there is no fear that there will be voids in the oil or between the shaft 3 and the oil, and any amount of air leaked into the oil will immediately move upward through the oil.

In this manner, leakage of air into the vacuum chamber in the casing past the tangent c will be positively prevented. Since the oil 13 leaking into the vacuum chamber through the tangential edge c also has a low vapor pressure, the interior of the casing 1 can be maintained in a very high vacuum state. Further, due to its low viscosity, the oil 13 can readily lubricate the packings 8 and 9 as well as the tangential edges at the shaft 3 so as to avoid a rapid wear thereof. Thus the life of the equipment is prolonged.

The general characteristics of oil employed for the invention are as follows:

| | Viscosity |
|---|---|
| Spindle oil | 60–150 |
| Dynamo oil | 110 |
| Machine oil | 120 |
| Turbine oil | 90–180 |

Any other liquid may be employed if the liquid has the same characteristics as the oil mentioned above.

There will now be obvious to those skilled in the art many modifications and variations of the above described structure. These modifications and variations will not depart from the scope of the invention if defined by the following claims.

What is claimed is:

1. Apparatus comprising a substantially airtight casing under vacuum, a rotary shaft disposed in said airtight casing, bearings in said airtight casing supporting said rotary shaft such that a portion of the shaft extends out of said casing, said bearings and casing providing an annular space, a pair of axially spaced, resilient, annular packing means in said space and arranged in sliding engagement with the circumferential surface of said rotary shaft, annular washers secured in axially spaced positions in said space and having respective conically tapered portions for supporting said packing means, said annular space being in communication with the atmosphere, and oil filled in said annular space, said oil having a low viscosity, a low fluidity and a low vapor pressure, said oil being subjected to the atmospheric pressure.

2. Apparatus as claimed in claim 1 wherein each of said packing means is formed with an outwardly tapered conical portion.

3. Apparatus as claimed in claim 1 comprising an oil tank arranged above said bearing means outside of said casing, said casing having a duct providing communication between said annular space and said tank, the oil in said tank being subjected to atmospheric pressure.

4. Apparatus as claimed in claim 1 wherein said airtight casing is provided with means for producing a vacuum in said casing.

References Cited

UNITED STATES PATENTS

| 2,254,862 | 9/1941 | Watson | 308—36.3 |
| 2,345,884 | 4/1944 | Powers | 308—36.1 |
| 2,350,697 | 6/1944 | Petch | 308—187 X |
| 2,565,791 | 8/1951 | Wagnen | 308—187 X |
| 2,684,274 | 7/1954 | Saxon | 308—187.1 |
| 2,945,709 | 7/1960 | Freed | 308—36.1 |
| 2,948,554 | 8/1960 | Mahand | 308—36.3 |
| 3,051,399 | 8/1962 | Stauffer | 308—36.1 |
| 313,180 | 3/1885 | Colwell | 277—21 |
| 1,076,962 | 10/1913 | Doble | 277—17 |
| 2,488,200 | 11/1949 | Juhlin | 313—60 |
| 3,361,490 | 1/1968 | Bassan | 308—187 X |

FOREIGN PATENTS

| 880,243 | 3/1943 | France. |
| 1,201,643 | 1/1960 | France. |
| 408,870 | 4/1934 | Great Britain. |
| 913,908 | 12/1962 | Great Britain. |
| 640,132 | 5/1962 | Italy. |
| 874,690 | 4/1953 | Germany. |

OTHER REFERENCES

German printed application 1,183,399, December 1964, Slhierloh.

MARTIN P. SCHWADRON, Primary Examiner

L. L. JOHNSON, Assistant Examiner

U.S. Cl. X.R.

277—59; 308—36.3, 187.1